US006857011B2

(12) United States Patent
Reinke (10) Patent No.: US 6,857,011 B2
(45) Date of Patent: Feb. 15, 2005

(54) METHOD OF REMOTE IMAGING

(75) Inventor: John P. Reinke, Oconomowoc, WI (US)

(73) Assignee: Paragon Development Systems, Inc., Oconomowoc, WI (US)

( * ) Notice: Subject to any disclaimer, the term of this patent is extended or adjusted under 35 U.S.C. 154(b) by 153 days.

(21) Appl. No.: 10/377,472

(22) Filed: Feb. 28, 2003

(65) Prior Publication Data

US 2004/0088367 A1 May 6, 2004

Related U.S. Application Data

(60) Provisional application No. 60/422,753, filed on Oct. 31, 2002.

(51) Int. Cl.$^7$ .............................................. G06F 15/16
(52) U.S. Cl. ................................................... 709/220
(58) Field of Search .............................. 709/220, 223, 709/217

(56) References Cited

U.S. PATENT DOCUMENTS

| | | | |
|---|---|---|---|
| 5,577,210 A | 11/1996 | Abdous et al. | |
| 5,675,769 A | 10/1997 | Ruff et al. | |
| 5,680,547 A | 10/1997 | Chang | |

(List continued on next page.)

OTHER PUBLICATIONS

Introduction to Ghost 6.5, Symantec, knowledge base, printed Feb. 14, 2002, http://service1.symantec.com/SUPPORT/ghost.nsf/pfdocs/2000082910555425.

Novadigm Issued Key Patent for Internet Software and Content Management, Unique 'Push/Pull' Model and 'Differencing' Technologies to be Licensed To Internet Content Service Providers, Dec. 23, 1996.

Patent Brief, Novadigm, Dec. 23, 1994, pp. 1–6, Novadigm, Inc., Mahwah, New Jersey.

Simple Boot Flag Specification Overview, Microsoft, Feb. 7, 2002, pp. 1–3, hhttp://www.microsoft.com/HWDEV/Resources/specs/simp_bios.asp.

How to Prepare Images for Disk Duplication with Sysprep, Microsoft, Nov. 29, 2001, pp. 1–3, http://www.microsoft.com/windowsxp/pro/using/itpro/deploying/duplication.asp.

White Paper: Windows NT Workstation 4.0 Deployment with Disk Image Copying and the Microsoft System Preparation Tool, Microsoft, Dec. 1998 (Revised: Apr. 2001), pp. 1–9.

Windows Instrumentation: WMI and ACPI, Microsoft, Last Updated Dec. 4, 2001, pp. 1–17, http://www.microsoft.com/hwdev/driver/wmi/wmi–acpi.asp.

WMI and CIM Concepts and Terminology, Microsoft Windows Platform Development, Last Updated Dec. 4, 2001, pp. 1–6, http://www.microsoft.com/hwdev/driver/WMI/WMI–CIMP.asp.

*Primary Examiner*—David Y. Eng
(74) *Attorney, Agent, or Firm*—Michael Best & Friedrich LLP (57) ABSTRACT

Method for remotely imaging a computer. In one embodiment the method includes establishing a connection between two or more computers, extracting information from a storage device, and executing commands to create and format partitions on the storage device. The method may also include changing a bootsector of a partition, transferring data including utility data and an image file to a partition, and activating a boot indicator associated with the partition so as to re-image the storage device upon rebooting. Embodiments of the invention also include methods for removing a computer name from an associated network or domain, and augmenting security and identity parameters to allow the computer to be re-associated with a network or domain. Embodiments of the invention may be implemented using an imaging tool that, in one embodiment, includes an initialization module having one or more interfaces with input fields, a format module, and a naming module.

34 Claims, 9 Drawing Sheets

U.S. PATENT DOCUMENTS

| | | | |
|---|---|---|---|
| 5,684,952 A | | 11/1997 | Stein |
| 5,706,472 A | | 1/1998 | Ruff et al. |
| 5,708,776 A | * | 1/1998 | Kikinis ........................ 714/55 |
| 5,764,593 A | | 6/1998 | Turpin et al. |
| 5,784,702 A | | 7/1998 | Greenstein et al. |
| 5,854,896 A | | 12/1998 | Brenner et al. |
| 5,887,164 A | | 3/1999 | Gupta |
| 5,919,247 A | | 7/1999 | Van Hoff et al. |
| 5,930,831 A | | 7/1999 | Marsh et al. |
| 5,948,101 A | | 9/1999 | David et al. |
| 5,961,642 A | | 10/1999 | Lewis |
| 6,012,130 A | | 1/2000 | Beyda et al. |
| 6,029,196 A | | 2/2000 | Lenz |
| 6,032,239 A | | 2/2000 | Beelitz |
| 6,044,438 A | * | 3/2000 | Olnowich ................... 711/130 |
| 6,055,633 A | | 4/2000 | Schrier et al. |
| 6,088,778 A | | 7/2000 | Ruff et al. |
| 6,092,155 A | * | 7/2000 | Olnowich ................... 711/142 |
| 6,098,098 A | | 8/2000 | Sandahl et al. |
| 6,108,697 A | | 8/2000 | Raymond et al. |
| 6,122,659 A | * | 9/2000 | Olnowich ................... 709/213 |
| 6,122,674 A | * | 9/2000 | Olnowich ................... 709/250 |
| 6,128,690 A | * | 10/2000 | Purcell et al. ............. 710/240 |
| 6,144,992 A | | 11/2000 | Turpin et al. |
| 6,151,674 A | | 11/2000 | Takatani |
| 6,185,575 B1 | | 2/2001 | Orcutt |
| 6,185,666 B1 | | 2/2001 | Murray et al. |
| 6,247,126 B1 | * | 6/2001 | Beelitz et al. ................. 713/1 |
| 6,253,300 B1 | | 6/2001 | Lawrence et al. |
| 6,260,068 B1 | | 7/2001 | Zalewski et al. |
| 6,263,377 B1 | | 7/2001 | Monday et al. |
| 6,330,653 B1 | | 12/2001 | Murray et al. |
| 6,334,149 B1 | | 12/2001 | Davis, Jr. et al. |
| 6,334,177 B1 | | 12/2001 | Baumgartner et al. |
| 6,343,346 B1 | * | 1/2002 | Olnowich ................... 711/142 |
| 6,345,294 B1 | | 2/2002 | O'Toole et al. |
| 6,347,331 B1 | | 2/2002 | Dutcher et al. |
| 6,470,446 B1 | * | 10/2002 | Beelitz et al. ................. 713/2 |

\* cited by examiner

METHOD OF REMOTE IMAGING

RELATED APPLICATIONS

The present application claims priority to co-pending provisional patent application No. 60/422,753, filed on Oct. 31, 2002.

FIELD OF THE INVENTION

The present invention relates to methods for imaging a computer. More particularly, embodiments of the invention relate to remotely imaging a computer memory over a network.

BACKGROUND OF THE INVENTION

In most computer systems, software and data required to execute applications and to maintain system and user configurations are stored in one or more storage devices, such as a RAM, ROM, or hard disk. Storage devices such as those listed are usually located locally within a housing of a computer. Hard disk drives in modern computers are capable of storing large amounts of data and software. In order to manage and organize the information stored in such drives, it is often desired to separate the storage device into one or more partitions so that data and programs may be stored in individually identifiable locations. For example, in many instances partitions provide logical divisions or allocations of addressable memory for locating and organizing data and operating systems. The partitions may be formatted according to a file structure, such as a new technology file system ("NTFS") structure or a file allocation table ("FAT") structure including, for example, FAT12, FAT16, or FAT32. In addition, multiple operating systems may be stored on a single hard drive by configuring the drive to include a separate partition for each operating system, for which a different file structure may also be implemented. When a computer is turned on a booting process begins execution of code in a master boot record ("MBR") that determines which partition should be selected to boot from, thus designating the configuration (i.e., which operating system and file structure) for the computer.

In many systems, and independent of a particular hard drive configuration, it is often desired to create a back-up or image of the hard disk configuration. The image may be a file that represents the current configuration of the computer hard drive including, for example, the operating system, applications, desktop customizations, and hardware drivers. The image file is usually compressed so it does not require the same amount of memory as the disk itself. It may be desired to reconfigure or re-image the hard drive for a variety of reasons including introducing new or revised applications and operating systems, installing drivers and utilities required for new hardware, and restoring a corrupted system with a previous configuration.

In some multi-terminal computer systems, a user or an administrator may be responsible to oversee the reconfiguration of multiple computer hard disks on multiple computers. Hard disk reconfigurations often require that the administrator physically go to each computer to execute the changes. In organizations having numerous computers, physically going to each computer to reconfigure it is time consuming. In some networked systems, an administrator may reconfigure a host terminal or server and then each networked computer terminal or client that connects to and utilizes the server memory will operate according to the reconfiguration. However, if it is desired that the terminals operate independent of a common server (e.g., as workstations) or have configurations that are different from other terminals on the network, the desired terminals are generally individually and physically visited.

SUMMARY OF THE INVENTION

Accordingly, a need exists for a method of remotely imaging or reconfiguring a computer terminal that does not require an administrator to physically go to the intended computer and allows subsequent operation that is independent of any host computer or server.

In one embodiment, the invention provides a method of configuring a storage device associated with a computer over a network including establishing a connection between the computer and a second computer, executing a management application or data extraction application on the computer, and executing commands to create and format partitions on the storage device. The method may also include changing a bootsector of a partition, transferring data including utility data and an image file to a partition, and activating a boot indicator of the at least one partition. Embodiments of the invention also include methods for removing the computer name from an associated network or domain, and augmenting security and identity parameters, including passwords, to allow the computer to be re-associated with a network or domain.

In some embodiments, the invention provides an imaging tool for a computer storage device including an initialization module operable to establish a connection between a first computer and a second computer and to extract information from the computer. The imaging tool may also include a format module operable to modify the configuration of a storage device, communicate information such as executable files to locations on the storage device, and designate a location of the storage device such that information based on one or more of the executable files is processed upon rebooting the storage device. In addition, a naming module is operable to augment computer security and identity parameters, and restore a configured computer with an associated network or domain. In some embodiments, the initialization module also includes a user interface including one or more displays having input fields. In at least one embodiment, the displays are operable to initiate a remote connection with one or more computers, an imaging process, an event notification process, a naming process which may include accessing a registry and domain controller for changing security and identity parameters, and operable to indicate a user security or access level. Other features and advantages of the invention will become apparent by consideration of the detailed description and accompanying drawings.

DETAILED DESCRIPTION

Before embodiments of the invention are explained in detail, it is to be understood that the invention is not limited in its application to the details of the examples set forth in the following description or illustrated in the drawings. The invention is capable of other embodiments and of being practiced or carried out for a variety of applications and in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. The terms "connected" and "coupled," and variations thereof, are used broadly and encompass both direct and indirect mounting, connecting, and coupling, including, for example, wired and wireless connections and couplings.

Before embodiments of the software modules or flow charts are described in detail, it should be noted that the invention is not limited to any particular software language described or implied in the figures and that a variety of alternative software languages may be used for implementation of the invention.

It should also be understood that many components and items are illustrated and described as if they were hardware elements, as is common practice within the art. However, one of ordinary skill in the art, and based on a reading of this detailed description, would understand that, in at least one embodiment, the components comprised in the method and tool are actually implemented in software.

Figure 1:
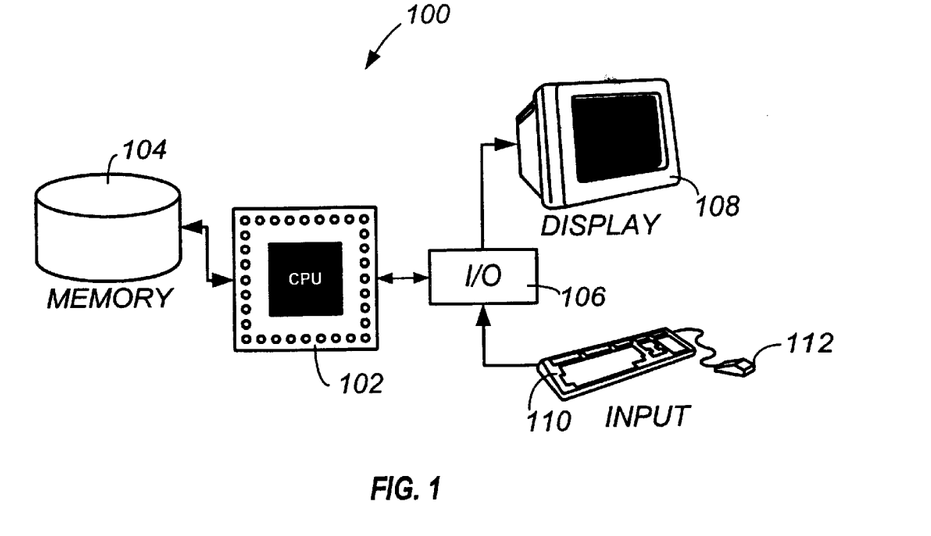
FIG. 1 illustrates components of an exemplary computer system associated with multiple embodiments of the invention.

Referring to FIG. 1, embodiments of the invention may be implemented using a conventional computer, such as the computer 100 shown. The computer 100 includes a central processing unit ("CPU") 102, a memory or data storage device 104, an input/output interface 106, a display device 108, and a plurality of input devices including a keyboard 110 and/or a mouse 112. One should note that the terms "memory" and "storage device" are herein used generically to mean either or both volatile and non-volatile data storage, such as a random access memory ("RAM") and a hark disk drive. In general, the exemplary computer 100 may include a variety of other known elements (voice recognition components, additional drives, peripherals, etc.) and software (operating system software, application software, etc.), and is not limited to the components shown in FIG. 1.

Figure 2:
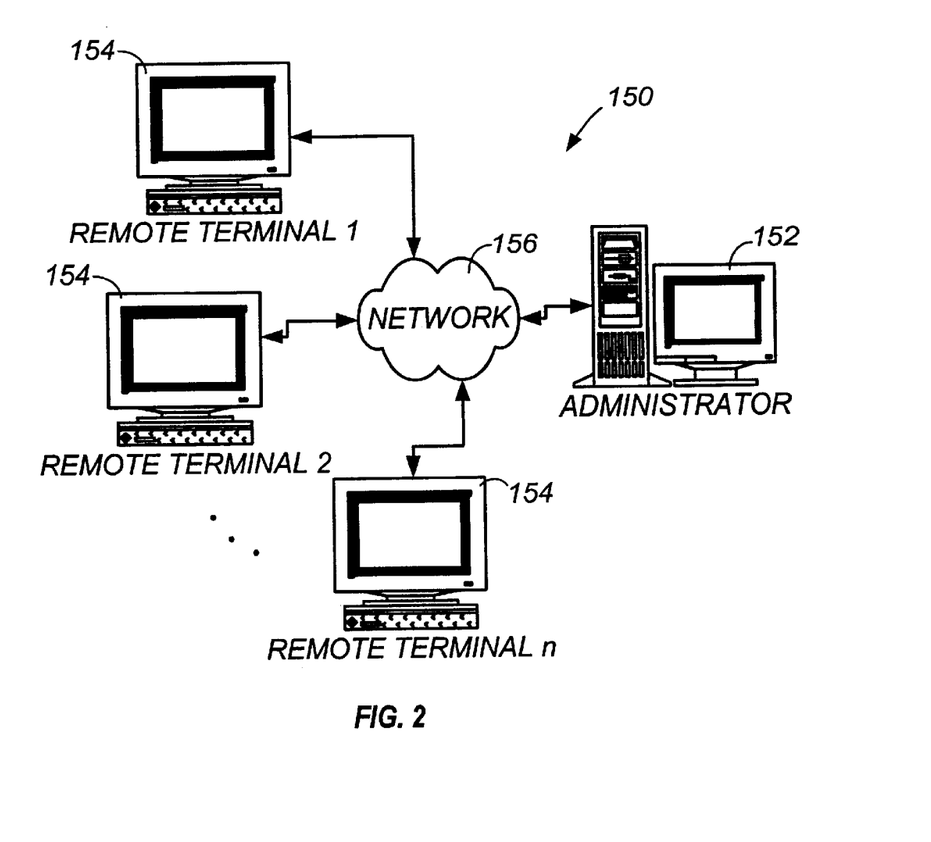
FIG. 2 shows an exemplary network of computers according to one embodiment of the invention.

In one embodiment of the invention, the storage device 104 of computer 100 may be configured with an operating system, such as Windows NT, and may be configured in an administrator-terminal relationship where a designated computer executes the protocol described herein in conjunction with a number of other computers or terminals that may or may not be coupled by a network. FIG. 2 illustrates an exemplary administrator-terminal-based system 150. The system 150 includes an administrative computer 152, multiple computers or terminals 154, and a network 156. The exemplary network 156 may take the form of one or more communications links connected such that information exchange between devices coupled to the network 156 is possible. Examples of networks suitable for use in embodiments of the invention include hard line (wired) and wireless local area networks ("LANs"), wide area networks ("WANs"), the Internet, an Intranet, and metropolitan area networks ("MANs"). In other embodiments, the invention may be implemented in a peer-to-peer system or other systems and configurations where, for example, a domain association does not exist.

Figure 3:
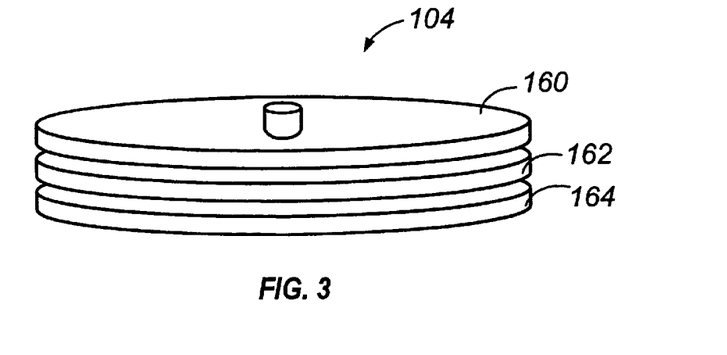
FIG. 3 illustrates an exemplary view of a storage device according to one embodiment of the invention.
Figure 4:
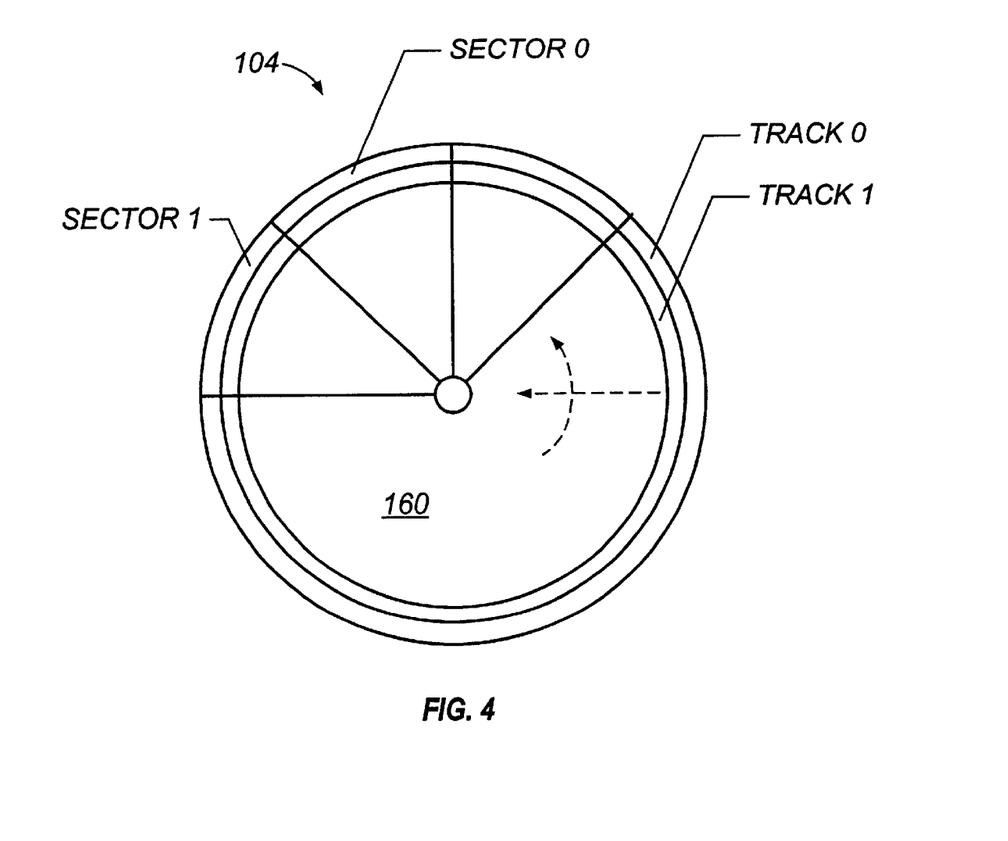
FIG. 4 depicts an exemplary organization of data on a storage device according to one embodiment of the invention.

FIG. 3 illustrates an exemplary configuration of a computer hard disk such as the storage device 104. In some embodiments of the invention, the storage device 104 may include data such as the operating system and system files, and may be configured to have a plurality of platters upon which data may be read and written by appropriately disposed read/write heads (not shown). Although the exemplary figure includes a first platter 160, a second platter 162, and a third platter 164, one skilled in the art will understand that a computer hard drive may be configured with more or less platters and that the invention may be implemented with a plurality of physical storage device configurations. To further describe an exemplary data storage protocol, FIG. 4 depicts a top view of the first platter 160. An exemplary organization of data on the storage device 104 includes designating a plurality of tracks beginning with "Track 0" at the outer most circumference and increasing numerically toward the center of the platter 160. Although only Track 0 and Track 1 are depicted, one will understand that the allocation of tracks continues concentrically inward (denoted by the radial dashed arrow). In addition to having multiple tracks, each track of the storage device 104 may be logically separated into multiple sectors starting with a Sector 0 and increasing numerically around the track (denoted by the arcing dashed arrow). As will be described in more detail below, embodiments of the invention include modules that may access and allocate specific tracks and sectors of a hard disk, such as Sector 0 and Track 0 of storage device 104, in order to execute the desired re-imaging process. In one embodiment of the invention, an initialization module 184 (FIG. 6) is operable to modify a partition table 174 (FIG. 5) that is coupled to a Master Boot Record ("MBR") typically located at Track 0 and Sector 0 of the storage device 104.

Figure 5:
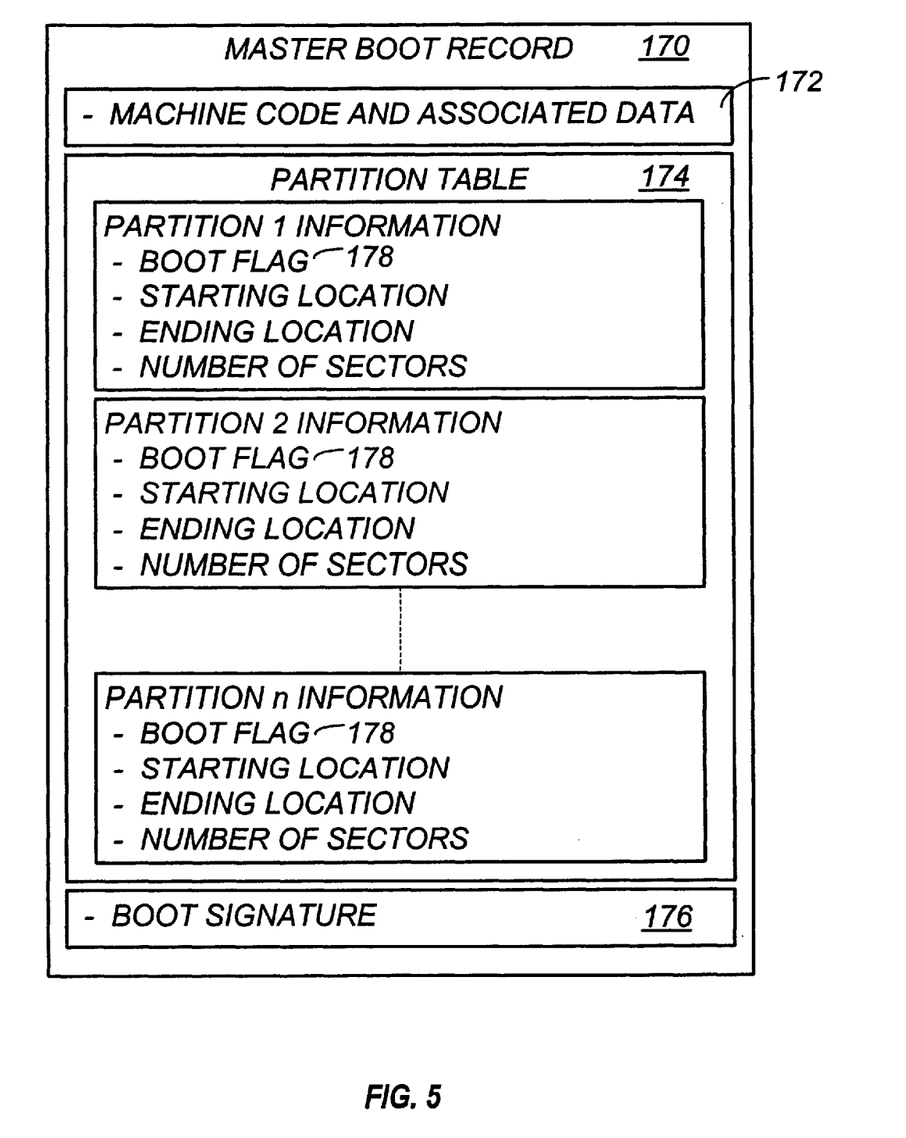
FIG. 5 illustrates an exemplary master boot record according to one embodiment of the invention.

An exemplary MBR 170, illustrated in FIG. 5, is accessed by the CPU 102 during computer startup and may include executable machine code 172 that provides instructions for reading the partition table 174 and a boot signature 176. The partition table may include information for each allocated partition on the storage device 104 including a boot flag 178, starting and ending locations or addresses, and the total number of sectors. To further describe an exemplary booting process for a computer, the following example is provided. Upon startup, and after an initial power on self test, the basic input/output system ("BIOS") determines which device to employ as a boot device, which may include a hard disk, floppy disk, or a storage device such as device 104. The determination may include searching for a valid boot signature 176 to indicate that the device is operable to boot from, and if the boot device is a hard disk, the MBR is loaded into the CPU 102. The MBR code 172 loads the bootsector referenced by the boot flag in the partition table for the "active" or selected partition, and then transfers CPU 102 execution to the start of the active partition's memory address.

As noted above, the disk image may be used for multiple purposes including reconfiguring corrupted computers to a previous or initial configuration. Such reconfiguration may be considered as an image or re-image process and preferred embodiments of the invention include an imaging tool for reconfiguring a computer storage device from a remote location. One in the art will understand that the invention is not limited to perform the above tasks and that other alternative functions, some of which will be discussed below, may be realized with the invention.

Figure 6:
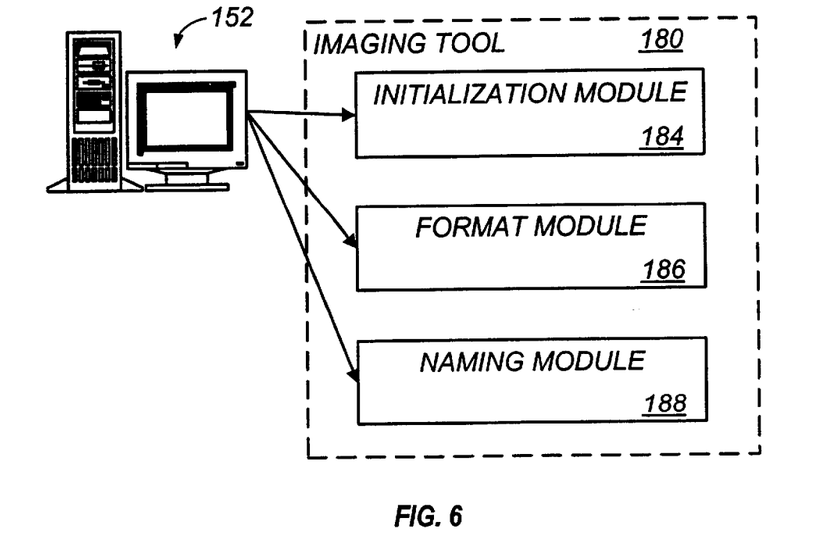
FIG. 6 illustrates exemplary modules of an imaging tool according to one embodiment of the invention.

FIG. 6 illustrates one embodiment of an imaging tool 180 that includes an initialization module 184, a format module 186, and a naming module 188. As noted, the imaging tool 180 may be used by a user stationed at the administrative computer 152 to remotely configure or reconfigure a storage device 104. During the imaging process, the modules may be executed on, or in a manner so as to affect, a computer, such as one or more remote terminals 154, over a network or data connection and without a person having to physically go to the one or more computers. As described in greater detail below, the initialization module 184 may include an interface, such as one ore more screens for receiving user input, routines for accessing one or more remote terminals 154, and routines for extracting system information from the remote terminals 154. The format module 186 may include routines for creating and formatting partitions on the storage device 104, copying data to the partitions, and augmenting a master boot record, such as MBR 170. The naming module 188 may include routines for rebooting the remote terminal 154 and for assigning or changing attributes associated with the remote terminal 154 that may be required for security identification and domain accessibility.

Figure 7:
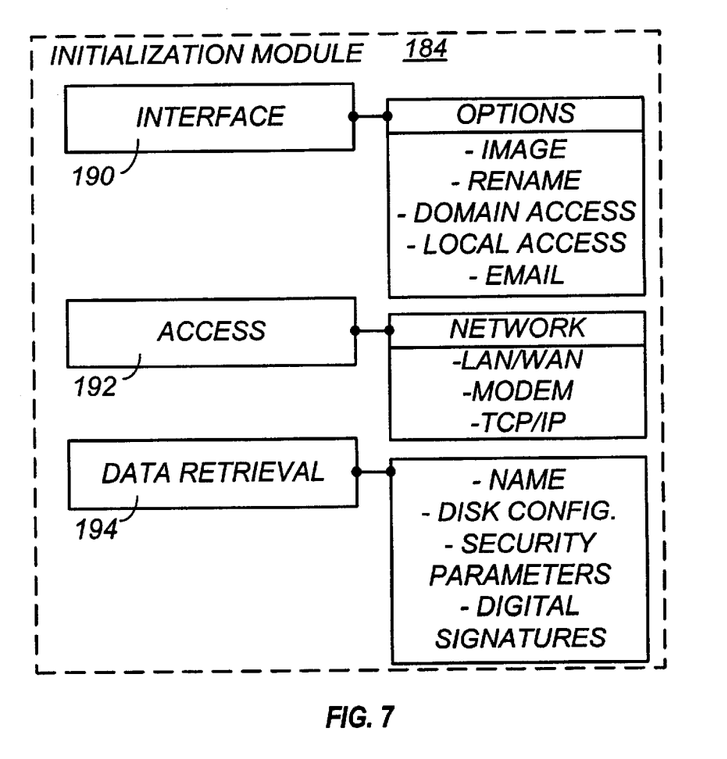
FIG. 7 illustrates routines associated with an initialization module implemented by the imaging tool.
Figure 13:
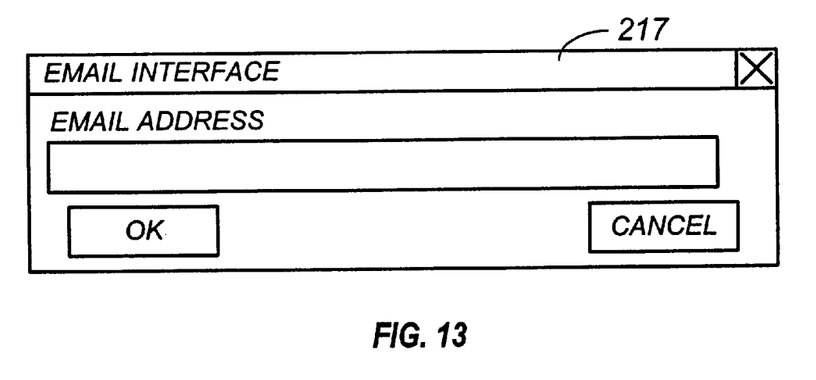
FIG. 13 illustrates an exemplary display according to one embodiment of the invention.

FIG. 7 illustrates one embodiment of the initialization module 184 associated with the imaging tool 180. The module 184 includes an interface routine 190, an access routine 192, and a data retrieval routine 194. The interface routine 190 may load or execute an interface (FIGS. 13–16). The interface may include graphical user interfaces ("GUI's") or Applets with multiple input fields and options selectable by the user. These options may include a request to re-image a computer, rename a computer, or both. Input fields may be included in the interface to allow the user to enter the name of the target computer and the desired new name for that computer (FIG. 13). The access routine 192 is initiated to establish a data transfer link between the administrative computer 152 and the remote terminal 154. As noted above, the link or connection may take the form of a TCP/IP based wired or wireless connection across a variety of networks such as a LAN, WAN, MAN, an Intranet, or the Internet. In addition, the access routine 192 may be designed to use a modem to create a dialup connection with a network hosting the remote terminal 154. The data retrieval routine 194 may be executed to extract information from the remote terminal 154. In some embodiments, the data retrieval routine 194 includes transferring and executing a management utility application from the administrative computer 152 to the remote terminal 154. In other embodiments, a management utility application may be previously loaded on the remote terminal 154 and the data retrieval routine 194 is operable to locate and execute the application on a storage device associated with the remote terminal 154. One utility suitable for use with the invention is Windows Management Instrumentation software developed by Microsoft, Inc. The extraction of information from the remote terminal 154 may include data related to the computer name, a current configuration of the storage device 104 including available memory and number of partitions, hardware and software types and versions, network adapter information including a media access controller ("MAC") address, or other parameters.

Figure 8:
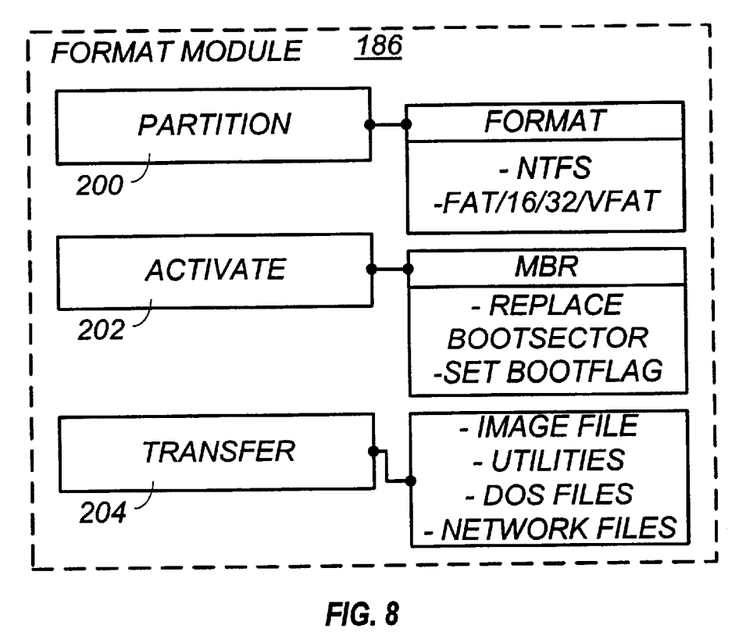
FIG. 8 illustrates routines associated with a format module implemented by the imaging tool.

FIG. 8 illustrates one embodiment of the format module 186 that includes a partition routine 200, an activate routine 202, and a transfer routine 204. The partition routine 200 is implemented to provide the creation of partitions on the storage device 104 associated with the remote terminal 154. As noted above, creating partitions may include establishing logical divisions of tracks and sectors for use as an addressable storage element that remains physically local to the storage device 104. The partition routine 200 is operable to format the partitions with a file structure including FAT16, FAT32, and NTFS structures. In some embodiments, an interface may be implemented to allow a user stationed at the administrative computer 152 to indicate the size and format of the partition. In other embodiments, the partition routine 200 may be implemented to create one or more partitions of predetermined size and format. The activate routine 202 is operable to read and augment a master boot record, such as MBR 170 (FIG. 5) of the storage device 104. In some embodiments the activate routine 202 may replace the bootsector for a particular partition that was created in, for example, the partition routine 200. The activate routine 202 is also operable to set the boot flag 178 for a particular partition of the storage device 104. In other embodiments, the activate routine 202 may be implemented to create partitions by reading the MBR 170 and rewriting the partition table 174 to include the desired memory separations or partitions. It should be noted that partitions may be created as logical partitions or as another type of memory partition. In one embodiment, the partition routine 200 may allocate space on a partition containing the computer's operating system and define the starting and ending sectors in the partition table 174 (FIG. 5) as partition boundaries. The main operating system may view this allocation of memory as a file. However, the MBR 170 views the allocation as a bootable partition. The image data and utility files may be copied, using the transfer routine 204, to one or more of these "embedded" partitions and the activate routine 202 may set a boot indicator, such as a boot flag 178, to select the "embedded" partition as active upon rebooting and subsequently execute one or more utilities stored therein. As noted, the transfer routine 204 is operable to convey information to the remote terminal 154 and may store the information in one or more of the partitions created on the storage device 104. The transferred or copied data may include one or more image files, a variety of executable files including system files, utility files, and DOS files, data such as bootsector and boot flag data, and other information.

Figure 9:
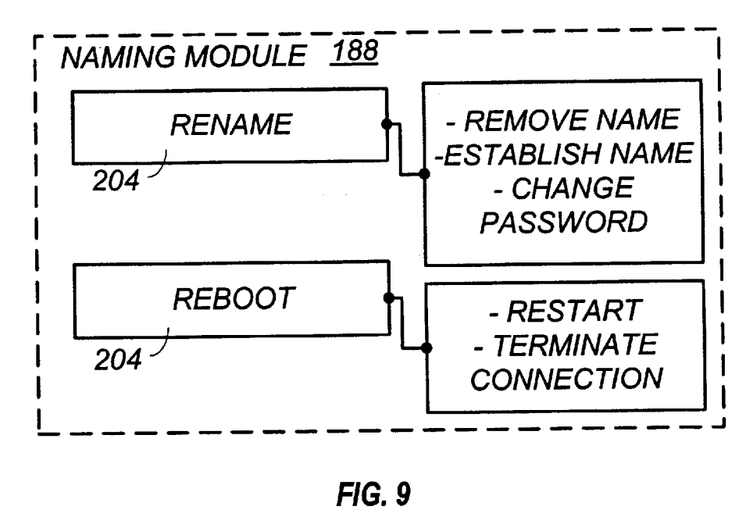
FIG. 9 illustrates routines associated with a naming module implemented by the imaging tool.

FIG. 9 illustrates one embodiment of the naming module 188 that includes a rename routine 210 and a reboot routine 212. When the imaging tool 180 is implemented on remote terminals 154 that are associated with a domain, the rename routine 210 is operable to access a registry, or other storage area that stores identification or domain parameters, to remove the name and password associated with the remote terminal 154. A name and a password are written back to the registry, or the like, and the previous computer name or a different computer name may be used. In addition, the imaging tool 180 may access a network controller, such as a domain controller, and an interface screen (FIG. 14) may prompt the user at the administrative computer 152 to augment information in the domain controller so that the remote terminal 154 name and password match the name and password stored in the registry of the remote terminal 154. The rename routine 210 may, therefore, change the password and rename the remote terminal 154 such that upon execution of the reboot routine 212, the remote terminal 154 may establish an association with appropriate domains. In other embodiments, the rename routine 210 may augment other parameters such as a security identification ("SID") for a remote terminal 154 configured on a peer-to-peer network. The reboot routine 212 is operable to initiate a restarting process associated with the remote terminal 154 and may also terminate the communications link between the administrative computer 152 and the remote terminal 154 upon completion of the imaging process.

It should be noted that the modules and routines in the imaging tool 180 are not limited in execution to the order presented in the figures or disclosed in the description. In particular, one skilled in the art will understand that many routines, for example the data retrieval routine 194, transfer routine 204, and reboot routine 212, may be called or executed more than once during an imaging process.

Figure 10:
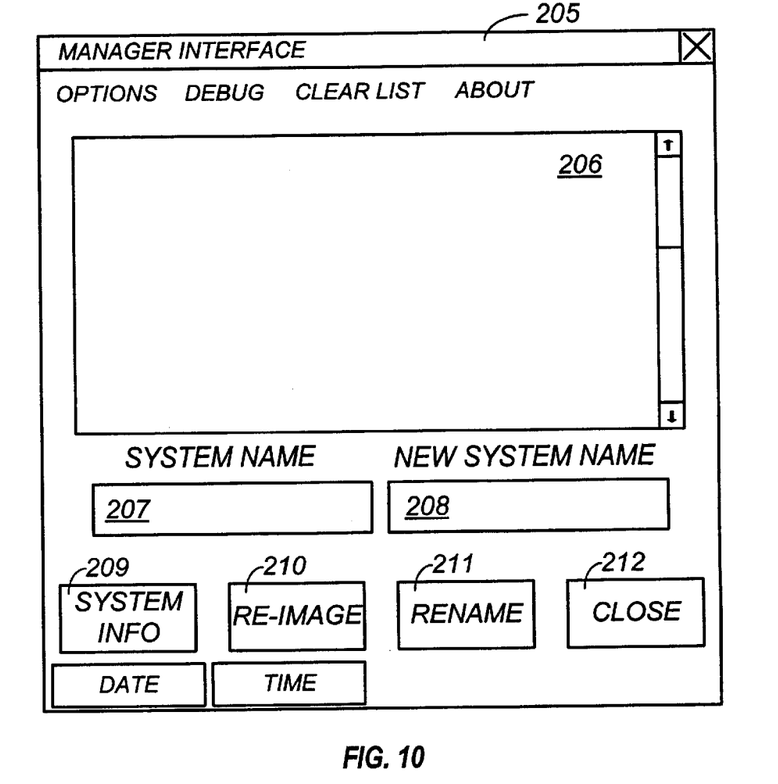
FIG. 10 illustrates an exemplary display according to one embodiment of the invention.

As noted above, embodiments of the imaging tool 180 include one or more displays such as interface screens that may be used to implement portions of a remote imaging process. FIG. 10 illustrates an exemplary manager interface 205 that includes a display 206 for displaying information related to steps executed in a imaging process and other information such as data extracted from the remote terminal 154. The manager interface 205 also includes multiple input fields such as a system name field 207 and a new system name field 208. In addition, multiple buttons, including a system information button 209, a re-image button 210, a rename button 211, and a close button 212, which are selectable by the user for initiating actions associated with modules and routines of the imaging tool 180. As one example, the system information button 209 may be selected to initiate the data retrieval routine 194 for the extraction of data, such as system information, from the remote terminal 154 and display the information on the display 206. In one embodiment, the re-image button 210 is selectable to start a re-imaging process whereby the above-described modules and routines are executed. The rename button 211 may be selected by the user to initiate routines associated with renaming the remote terminal 154. Selection of the close button 212 closes the manager interface 205.

It should be noted that the subset of the routines described above may be executed in response to the selection of one of the buttons 209–212. In addition, this interface is only exemplary in that other or additional functions may be associated with user selectable inputs or buttons on the manager interface 205. For example, in other embodiments the manager interface 205 of the imaging tool 180 may be implemented with buttons and inputs to initiate a process whereby the digital signature associated with software on a remote terminal 154 is documented. The imaging tool 180 may be implemented to extract the digital signatures from the remote terminal 154 and save them in a database that is part of the administrative computer 152 or another, possibly server-based, storage element. The imaging tool 180 may then be used to periodically check the system information of multiple remote terminals 154 to see if the software signatures correspond to what's stored in the database. If a discrepancy occurs, due to for example a corrupted file, the imaging tool 180 may then initiate a re-imaging process or remotely replace the corrupted files to correct such discrepancy. In one embodiment, the above-described function may be a routine or utility based on a WIN32, DOS, or other platform.

In other embodiments, the imaging tool 180 may be implemented with a database of system information for multiple remote terminals 154 such that a batch re-image process may be scheduled and executed without further input by a user or administrator. For example, the batch process may occur overnight and a generated report or event log may indicate which remote terminals 154 were successfully re-imaged, which failed, and other statistics. A backup image of the remote terminal 154 may also be saved such that a restoration back to a previous configuration is possible.

Figure 11:
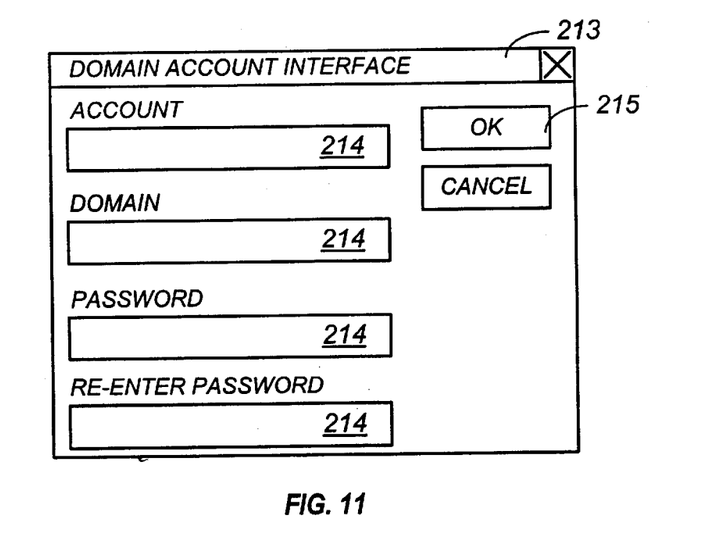
FIG. 11 illustrates an exemplary display according to one embodiment of the invention.

FIG. 11 illustrates a domain account interface 213 that includes multiple input fields 214 including an account field, a domain field, a password field, and a password verification field. In some embodiments, domain account interface 213 is implemented during an imaging process for those remote terminals 154 that are associated with a domain. The input fields 214 may be populated with the new account or computer name and password for the remote terminal 154 and selection of the "OK" button 215 may initiate, as described above, the replacement of such information in the domain controller. In other embodiments, the above-described augmentation of the domain controller may occur automatically, but the domain account interface 213 may be presented to the user for authorization of domain access rights.

In other embodiments where the remote terminals 154 are not associated with a domain, such as peer-to-peer systems, a local account interface 216 may be implemented to change a security identification parameter. In addition, the local account interface 216 may be implemented as a "fail safe" feature for remote terminals 154. In the event that a remote terminal 154 fails to re-establish a domain association, the local account interface 216 may be implemented to provide access to the local security account ("LSA") of the remote terminal 154.

Figure 12:
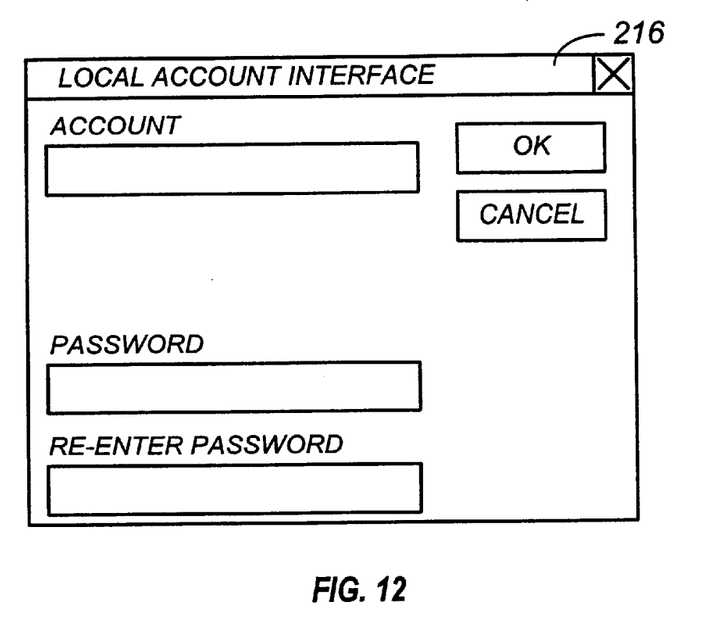
FIG. 12 illustrates an exemplary display according to one embodiment of the invention.

FIG. 12 illustrates an email interface 217 that, in some embodiments, may be presented to the user when an action is performed. The email interface 217 allows the user to send an event notification to individuals or an email distribution list. In other embodiments, the email or event notification function may be automated such that steps executed in an imaging process are logged and sent to appropriate individuals or groups. In addition, the event notification function may be used as a security check for administrators or managers overseeing the configuration of one or more computers.

Figure 14:
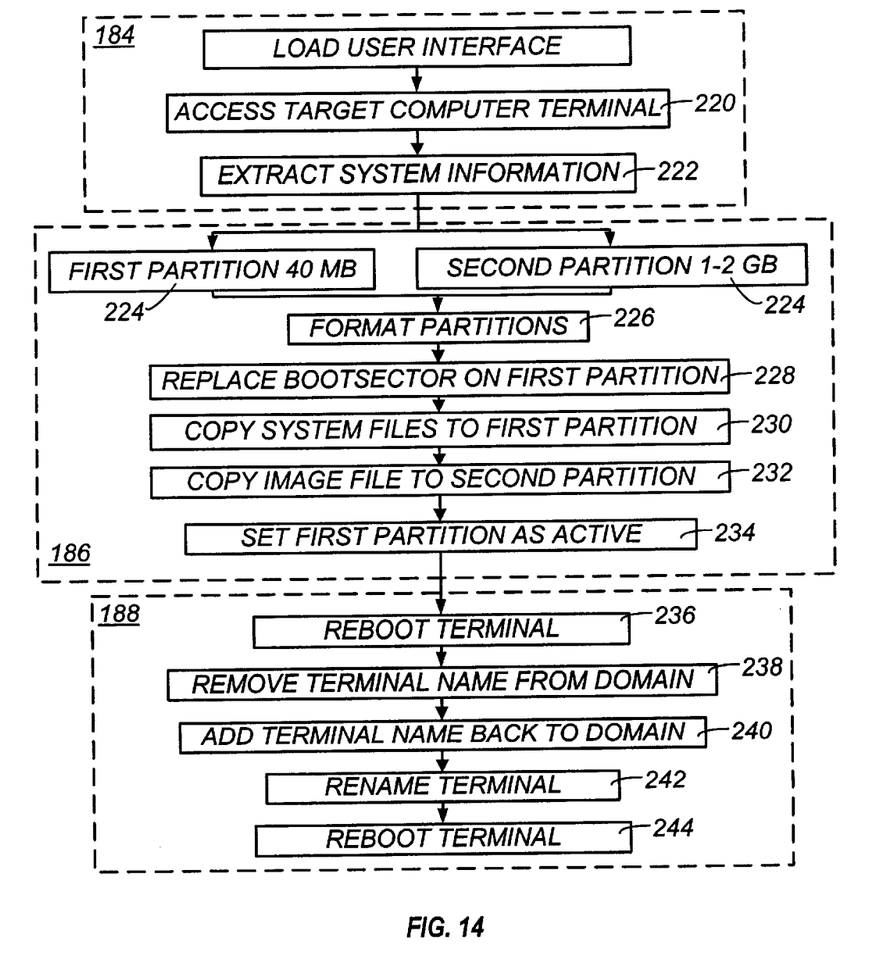
FIG. 14 illustrates steps of an exemplary imaging process according to one embodiment of the invention.
Figure 15:
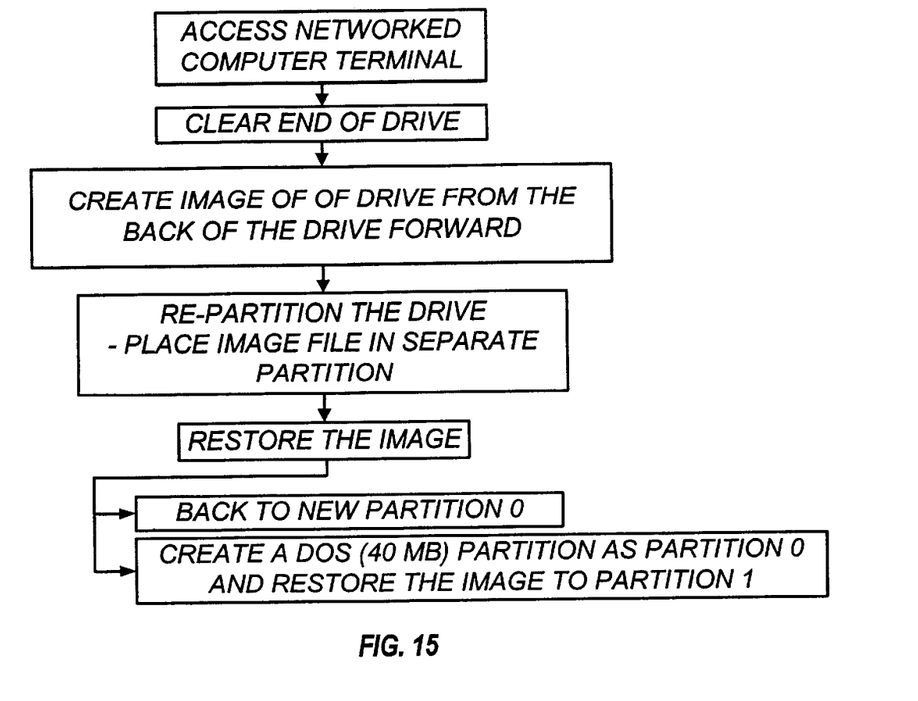
FIG. 15 illustrates steps of another exemplary imaging process according to one embodiment of the invention.
Figure 16:
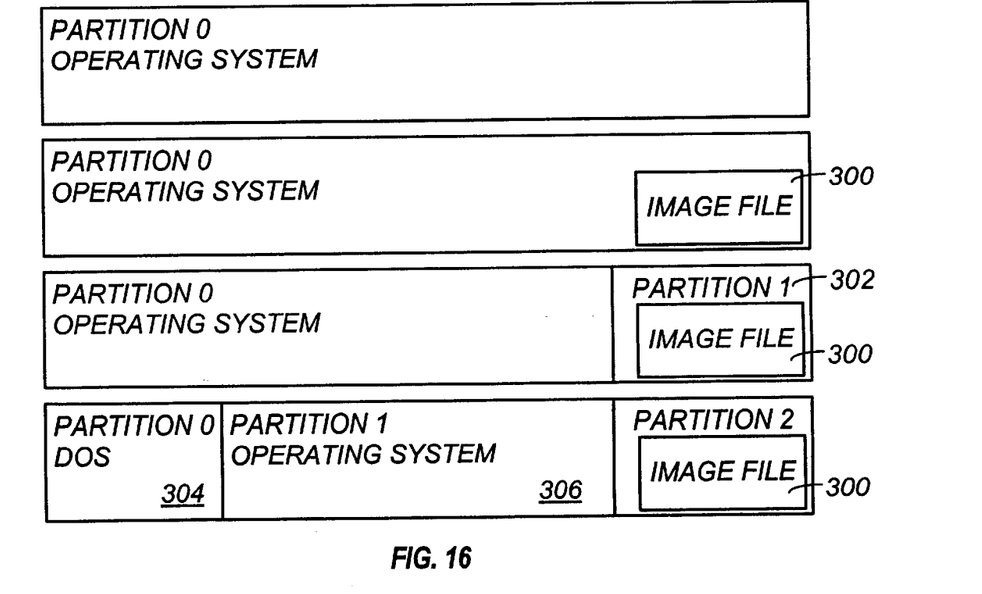
FIG. 16 illustrates a storage device configuration for the exemplary imaging process illustrated in FIG. 15.

To further describe the operation of the imaging tool 180, FIGS. 13–15 illustrate exemplary embodiments of the invention including steps performed by the imaging tool 180 for specific exemplary imaging processes. More specifically, FIG. 13 illustrates one imaging process implemented by the imaging tool 180 and initiated by a user stationed at an administrative computer 152. The steps illustrated in FIGS. 13–15 are exemplary in order and content, and the imaging tool 180 may be implemented with a subset of the depicted steps or additional and alternative steps. In addition, the imaging tool 180 is not limited to the described number, size, or format of the created partitions, the specific files that are transferred to the partition, and other steps that are specified in the description of the Figures.

Referring to the exemplary embodiment illustrated in FIG. 13, a user stationed at a computer, such as the administrative computer 152, may implement the imaging tool 180 and launch the, initialize module 184, whereby the manager interface 205 is presented. The appropriate input fields are populated including, for example, the current name and a new name for the computer terminal 154 (FIG. 2) to be re-imaged. In other embodiments, an input field may be used to enter a list of computer names for a batch or multicast re-imaging process. For the exemplary process shown in FIG. 13, the initialize module 184 proceeds by executing the above-described routines to establish a data or communications link (step 220) with the remote terminal 154 and initiate the management application (step 222). As noted, the management application may be local to the remote terminal 154 or be copied to the remote terminal 154 from the administrative computer 152 or another memory device. Once the system data has been extracted from the remote terminal 154, the partition routine 200 of the format module 186 is executed to create a 40 MB first partition and a 1–2 GB second partition (step 224) on the remote terminal's storage device 104. The partitions are formatted with a FAT16 file structure (step 226), though others are possible, and the activate routine 202 replaces the bootsector on the first partition with a DOS FAT16 bootsector (step 228). It should be noted, that the replacing of the bootsector that occurs at step 228 may or may not be necessary. Whether the bootsector is replaced depends on the compatibility of the operating system running on the remote terminal 154. In this example, a DOS FAT16 bootsector is used in place of a Windows NT bootsector, however, various other system formats may be implemented with the invention including a Linux-based version.

The imaging tool 180 continues the exemplary imaging process of FIG. 13 by executing the transfer routine 204 (FIG. 8). The transfer routine 204 includes a plurality of data exchange steps such as copying or transferring data to the first and second partitions. More specifically, system files, for example IO.sys and MSDOS.sys, and appropriate DOS files are copied (step 230) to the first partition. In addition, utility files including one or more of the above-described executable routines may be copied to the first partition and a desired disk image file transferred (step 232) to the second partition. In other embodiments, the image file is not transferred to the remote terminal 154, but is kept on the administrative computer 152 or a network server. In such cases, network utilities used to access the image file location may be copied to one of the created partitions. Execution of the activate routine 202 (FIG. 8) includes altering the MBR 170 such that the first partition is designated (step 234) as the active or selected partition. This designation may be implemented by changing or setting a boot indicator, such as the boot flag 178 (FIG. 5), in the partition table 174. Upon a reboot (step 236) of the remote terminal 154, the MBR 170 executes code to provide information related to the location of the bootsector for the first partition. The execution of the bootsector for the first partition may result in loading the DOS files and running script files to initiate the loading of the image file, whereby the remote terminal 154 is reconfigured with a new disk image. In this example, the storage device 104 is re-imaged based on the configuration of the image file stored on the second partition.

The routines in the naming module 188 are executed to reboot the remote terminal 154 (step 236) and delete the computer name (step 238) from a local registry. The domain account interface 213 (FIG. 11) prompts the user to change the computer name and password in the network domain controller such that the information matches the information stored in the local registry of the remote terminal 154. The name of the remote terminal 154 may be reestablished as the previously stored name. However, in this exemplary process, the password is changed in the domain controller to allow the remote terminal 154 to reconnect with the network domain. As noted above, in other embodiments the security identification ("SID") is changed for remote terminals 154 that are part of a peer-to-peer system. Once the remote terminal 154 is imaged and renamed, the remote terminal 154 is rebooted and the communications link between the administrative computer 152 and the remote terminal 154 is terminated.

The imaging tool 180 is not limited to the creation of the above-described partitions and different numbers of partitions having other sizes may also be created. One of ordinary skill in the art will also understand that the use of the term "create," and variations thereof, with reference to partitions is used generically to denote the general allocation or designation of addressable locations on a storage device.

As described above, the image tool 180 may be implemented for a plurality of storage device imaging applications. FIGS. 14 and 15 respectively illustrate steps performed by the image tool 180 for an alternative imaging process and a portion of a storage device 104 corresponding to the progression of the imaging steps. Referring to FIG. 14, utilizing the modules and routines included with the image tool 180, the remote terminal 154 is accessed from an administrative computer 152 over a network. The manager interface 205 (FIG. 10) is used to initiate the remote imaging process such that a portion of a partition 0 (FIG. 15) of the storage device 104 is cleared and an image file 300 (FIG. 15) is created from the back of the storage device 104 forward. A portion of the storage device 104 is partitioned as an image partition 302 (FIG. 15) and the image file 300 is saved at a storage location addressed therein. In this embodiment, the image tool 180 provides the option to restore the created image back to the new partition 0 or, as an alternative, a DOS partition 304 may be created and the image file 300 restored to the partition 306 (FIG. 15). As noted above, other routines and functionality included in the image tool 180 may be implemented in the exemplary imaging process described above.

As noted above, the imaging tool 180 may be implemented for a variety of imaging applications. In some embodiments, an image file is transferred to a partition on the remote terminal 154 and, upon rebooting the remote terminal, one or more utilities execute to complete the imaging process. In other embodiments, an image file may be located on a network server or shared drive and network utilities are transferred to a partition such that, upon reboot of the remote terminal 154, the image file is accessed from the network location.

As can be seen from the above description, the invention provides a system and method for remotely imaging a computer over a network. Various additional features of the invention are set forth in the appended claims.

What is claimed is:

1. A method of configuring a storage device associated with a computer over a network, the method comprising:

establishing a connection between the computer and a second computer;

executing a management application on the computer;

executing commands initiated by the second computer to create at least one partition on the storage device;

formatting the at least one partition to have a first bootsector;

replacing the first bootsector, with a second bootsector, the second bootsector being different from the first bootsector;

copying one or more executable files and an image file to the at least one partition;

activating a boot indicator of the at least one partition;

removing the computer name from a location on the storage device; and augmenting one or more identification parameters;

wherein activating the boot indicator causes the computer to process at least one of the executable files and the image file to re-image at least a portion of the storage device.

2. The method of claim 1, wherein augmenting one or more identification parameters includes changing a security identification parameter of the computer.

3. The method of claim 1, wherein augmenting one or more identification parameters includes accessing a domain controller.

4. The method of claim 1, wherein the method further comprises restarting the computer associated with the storage device.

5. The method of claim 1, wherein the one or more parameters includes a computer name and a password.

6. The method of claim 1, wherein the at least one partition is formatted with a 16 bit file allocation table.

7. The method of claim 1, wherein the at least one partition is formatted with a 32 bit file allocation table.

8. The method of claim 1, wherein the boot indicator is a boot flag.

9. A method of configuring a storage device associated with a computer over a network, the method comprising:

establishing a connection between the computer and a second computer;

executing a management application on the computer;

executing commands initiated by the second computer to create a first partition and a second partition on the storage device;

formatting the first partition to have a first bootsector;

replacing the first bootsector, with a second bootsector, the second bootsector being different from the first bootsector;

copying one or more executable files to the first partition;

copying one or more image files to the second partition;

activating a boot indicator of the first partition;

replacing the computer name and password stored on the storage device; and augmenting one or more identification parameters;

wherein activating the boot indicator causes the computer to process at least one of the executable files and the image file to re-image at least a portion of the storage device.

10. The method of claim 9, wherein augmenting one or more identification parameters includes changing a security identification parameter of the computer.

11. The method of claim 9, wherein augmenting one or more identification parameters includes accessing a domain controller.

12. The method of claim 9, wherein the method further comprises restarting the computer associated with the storage device.

13. The method of claim 9, wherein the one or more parameters includes a computer name and a password.

14. The method of claim 9, wherein the at least one partition is formatted with a 16 bit file allocation table.

15. The method of claim 9, wherein the at least one partition is formatted with a 32 bit file allocation table.

16. The method of claim 9, wherein the boot indicator is a boot flag.

17. A method of configuring a storage device associated with a computer over a network, the method comprising:

establishing a connection between the computer and a second computer;

executing a management application on the computer;

executing commands initiated by the second computer to create at least one partition on the storage device;

formatting the at least one partition to have a first bootsector;

replacing the first bootsector, with a second bootsector, the second bootsector being different from the first bootsector;

copying one or more executable files to the at least one partition;

activating a boot indicator of the at least one partition;

removing the computer name from a location on the storage device; and augmenting one or more identification parameters;

wherein activating the boot indicator causes the computer to process at least one of the executable files to access an image file over the network to re-image at least a portion of the storage device.

18. The method of claim 17, wherein augmenting one or more identification parameters includes changing a security identification parameter of the computer.

19. The method of claim 17, wherein augmenting one or more identification parameters includes accessing a domain controller.

20. The method of claim 17, wherein the method further comprises restarting the computer associated with the storage device.

21. The method of claim 17, wherein the one or more parameters includes a computer name and a password.

22. The method of claim 17, wherein the at least one partition is formatted with a 16 bit file allocation table.

23. The method of claim 17, wherein the at least one partition is formatted with a 32 bit file allocation table.

24. The method of claim 17, wherein the boot indicator is a boot flag.

25. A system for remotely imaging a storage device, the system comprising:

a first computer and at least one second computer, wherein the first and second computer are operable to communicate using a network connection therebetween; and an imaging tool having one or more routines operable to initiate a communications link between the first and at least one second computer, extract information from one of the first and at least one second computer, create one or more partitions on the storage device, transfer information from a network location to the one or more partitions, augment parameters associated with a computer identification and domain association, and operable to cause a re-image operation wherein a bootsector on the storage device initiates execution of at least a portion of the information communicated to the one or more partitions.

26. The system of claim 25, wherein the information storage device is a computer hard disk having a configuration that includes a master boot record.

27. The system of claim 25, wherein the connection between the first computer and the second computer is wireless.

28. An imaging tool comprising:
   an initialization module operable to establish a connection between a first computer and a second computer, and to extract information from the computer, and including;
   one or more interfaces having a plurality of input fields;
   a format module operable to modify the configuration of a storage device on the first computer, communicate executable files to locations on the storage device, and to designate a location of the storage device such that information based on one or more of the executable files is processed upon rebooting the storage device; and
   a naming module operable to augment security and identification parameters associated with the computer.

29. The imaging tool of claim 28, wherein the one or more displays are operable to initiate an imaging process.

30. The imaging tool of claim 28, wherein the one or more displays are operable to initiate a remote connection with the computer.

31. The imaging tool of claim 28, wherein the one or more displays are operable to initiate a renaming process.

32. The imaging tool of claim 28, wherein the one or more displays are operable to provide event notification.

33. The imaging tool of claim 28, wherein modifying the configuration of the storage device includes creating at least one partition.

34. The imaging tool of claim 28, wherein the designation of a location of the storage device includes changing a boot indicator associated with the at least one partition.

* * * * *